No. 837,044. PATENTED NOV. 27, 1906.
A. L. R. ELLIS.
TESTING DEVICE.
APPLICATION FILED OCT. 23, 1905.
2 SHEETS—SHEET 2.
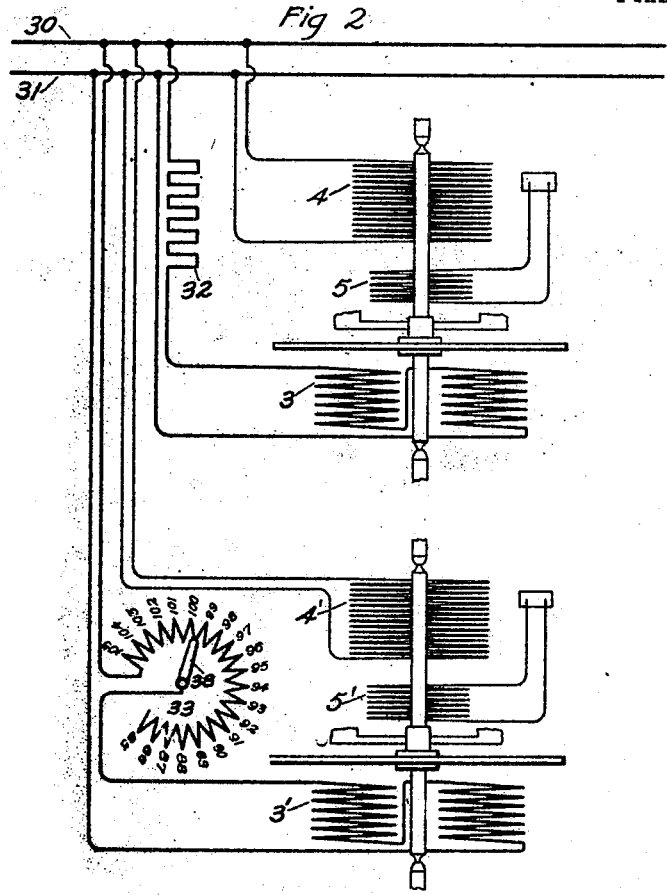
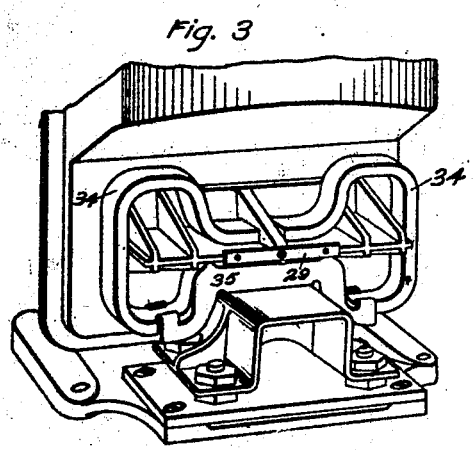
Witnesses:-
Inventor:
Alvarado L. R. Ellis
By Albert... 
Att'y.

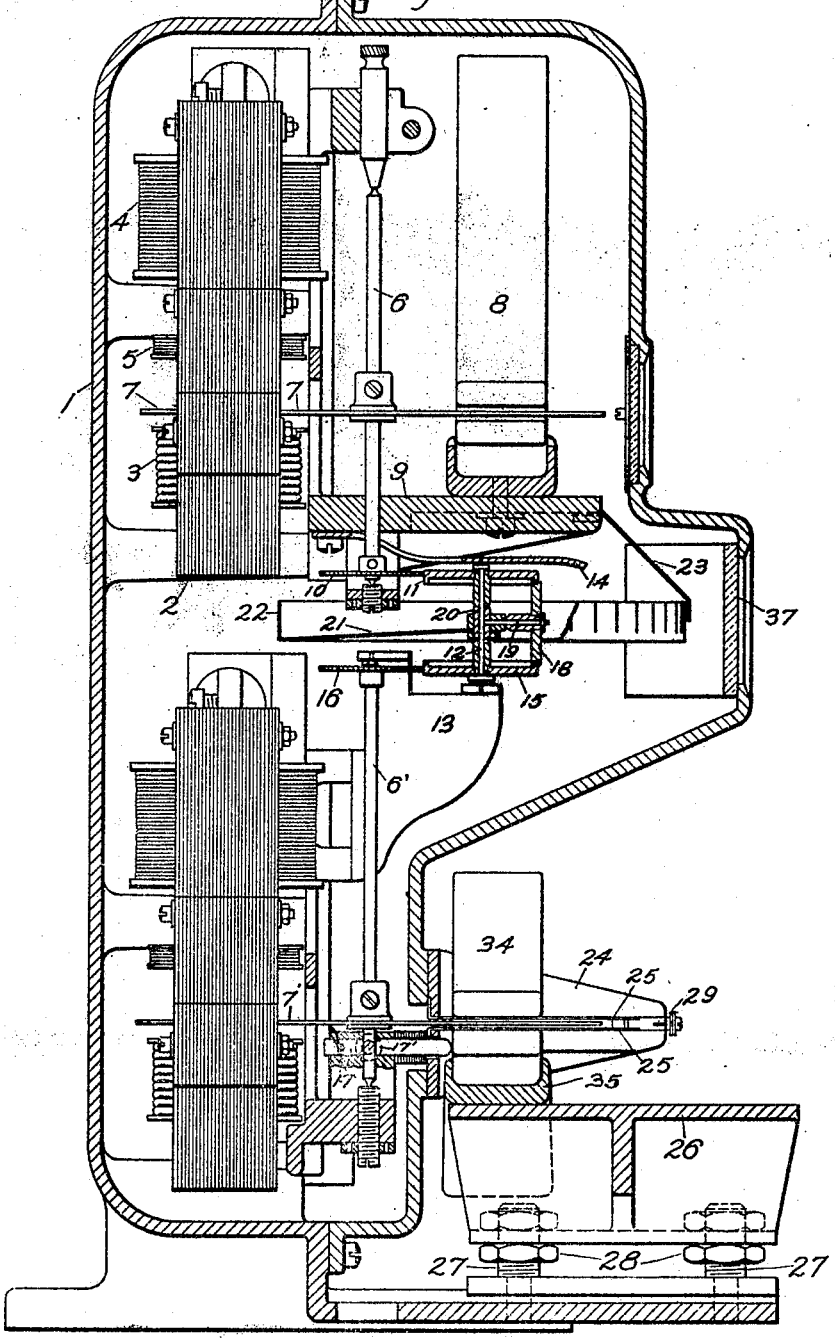

UNITED STATES PATENT OFFICE.

ALVARADO L. R. ELLIS, OF LYNN, MASSACHUSETTS, ASSIGNOR TO GENERAL ELECTRIC COMPANY, A CORPORATION OF NEW YORK.

TESTING DEVICE.

No. 837,044.   Specification of Letters Patent.   Patented Nov. 27, 1906.

Application filed October 24, 1905. Serial No. 284,014.

*To all whom it may concern:*

Be it known that I, ALVARADO L. R. ELLIS, a citizen of the United States, residing at Lynn, county of Essex, State of Massachusetts, have invented certain new and useful Improvements in Testing Devices, of which the following is a specification.

This invention relates to testing devices, and particularly to devices for testing magnets.

The object of the invention is to provide a device for testing magnets which is unaffected by temperature changes, in which errors due to air-currents are prevented, which measures the effective strength of the magnets rather than the total number of lines of force set up thereby, with which errors due to friction or faulty observation of the operator are reduced to a minumum, and which permits of testing magnets with great accuracy and rapidity.

Permanent magnets are largely employed in electrical measuring instruments to retard the movements of the movable element of the instrument or to afford operating torque. Obviously it is important that for all such uses, and particularly for use in integrating meters of the motor type, the strength of the magnet should be known. These magnets are ordinarily used coöperating with a plate or disk of conducting material mounted on the shaft of the movable element of the instrument to rotate in the field of the magnet, so that the movements of the movable element are retarded by the generation of eddy-currents in this disk or plate. For this reason the measurement of the strength of the magnet should be a measurement of its drag effect rather than a measurement of the total number of lines of force set up by the magnet, since the drag effect of two magnets having the same number of lines of force may differ owing to differences in the distribution of the lines with respect to the pole-faces. I therefore provide means for measuring a magnet in just the way it is used in a measuring instrument—that is, by measuring the retardation of a plate or disk moving in its field.

In carrying out my invention I employ two similar motor mechanisms having their shafts arranged to actuate a differential gear which serves to give an indication of the relative speeds of the two shafts. The shaft of one of the motors carries a plate or disk of conducting material arranged to rotate in the field of a magnet of known strength, which is used as a standard of comparison. The shaft of the other motor carries a similar plate or disk, and to this the magnets to be tested are applied in the same manner as the standard magnet is applied to the disk of the first motor. If a magnet to be tested is applied to the disk of the second motor mechanism and the two similar motor mechanisms are run under exactly the same conditions, their speeds will be inversely proportional to the drag effects of the two magnets and their coöperating disks. In order that the magnets may be tested rapidly, I employ electric motors to drive the shafts carrying the disks of conducting material and provide means for varying the current supplied to the motor driving the disk with which the magnets to be tested coöperate. Then by varying the current supplied to this motor until the two shafts are rotating at the same speed, as indicated by the differential gear, the strength of the magnet to be tested relative to the standard magnet may be obtained from the ratio of the energy consumed by the two electric motors.

The novel features of my invention will be definitely indicated in the claims appended hereto.

The details of construction and the method of operation of my improved testing device will be better understood by reference to the following description, taken in connection with the accompanying drawings, which show the preferred embodiment of the invention, and in which—

Figure 1 is a sectional elevation of my improved magnet-testing device. Fig. 2 is a diagram of the electrical connections, and Fig. 3 is a perspective view of the support for the magnets to be tested.

Referring to the drawings, 1 indicates a casing, which incloses the operating parts, within which are mounted two motor mechanisms, one above the other. These motors are preferably of the same size and are similar in all their constants and characteristics. In the drawings are shown two small electric motors such as are employed in integrating electric meters. These are induction meter-motors of standard construction, each consisting of a magnetic structure 2, provided with suitable poles, on which are mounted series coils 3, a shunt-coil 4, and a short-circuited coil 5 for lagging the flux due to the potential coil 4, and a shaft 6, mounted for rotation in suitable bearings and carrying a disk armature 7, which is arranged to rotate between the poles on which the series and shunt coils 3 and 4 are mounted. Rotation of the moving element of the upper meter is retarded by a permanent magnet 8, mounted on the frame 9 in such a position that the disk 7, of conducting material, carried by shaft 6, rotates in its field. The magnet 8 is a standard to which other magnets are to be compared. On the shaft 6 is mounted a gear 10, meshing with a gear 11, which is loose on a shaft 12. This shaft is mounted for rotation in bearings formed one in the frame 13 of the lower motor mechanism and the other in a spring-arm 14, whose inner end is secured to the frame 9 and whose outer end may be moved against the tension of the spring, so as to release shaft 12 to permit of removing the shaft and the parts of the differential gear which are carried thereby. A gear 15, similar to the gear 11, is loose on shaft 12 at its lower end and meshes with a gear 16, carried by the shaft 6' of the lower motor mechanism. The gears 11 and 15 have teeth formed on the adjacent sides thereof, with which meshes a gear 18, loose on a shaft 19, which is secured to a sleeve 20, mounted on shaft 12. Extending radially from sleeve 20 are a plurality of arms 21, which at their outer ends carry a ring 22, having marks thereon, as shown in Fig. 1. An indicator 23, extending down from the frame 9 over the ring 22 enables the operator to accurately read the movements of the ring 22 of the differential gear.

The disk 7' of the lower motor mechanism extends through an opening in the casing 1 and into a slot in an auxiliary casing 24, of non-magnetic material, secured to the main casing 1 and forming an inclosure, having very thin walls above and below the portion of the disk 7' extending beyond the casing 1. The auxiliary casing 24 is preferably a casting of brass heavily ribbed to give it greater strength and provided with ledges on which rest thin sheet-metal plates 25, which form the top and bottom of the inclosure. The thickness of the inclosure is the same as the air-gap between the poles of a magnet to be tested. Below the inclosure 24 is a support 26, mounted on the base of the casing 1 and arranged to be adjusted vertically by means of screws 27, projecting upwardly from the base of the casing 1 and nuts 28 on these screws positioning the support 26. The upper surface of support 26 is shaped so as to receive a magnet to be tested and guide it as it is slid over the surface of the support into position, with its poles one above and the other below the inclosure 24. Two pins 17 are mounted in openings in the frame 13 of the lower motor mechanism and extend through openings in the auxiliary casing 24, and the ends of these pins are engaged by a magnet to be tested when the latter is being moved into position to limit the movement of the magnet and to insure accurate positioning of the magnet with respect to the disk 7'. The pins 17 may be moved to the desired position in the openings in frame 13 and then locked in that position by set-screws 17'. If desired, a wiper 29 may be mounted on the forward end of the inclosure 24 to brush off the poles of the magnets as they are slid into position on the inclosure, and thus remove all dirt therefrom.

The electrical connections are shown diagrammatically in Fig. 2, in which 30 and 31 indicate mains of substantially constant potential leading from a source of supply of alternating-current electric energy. The shunt-coils 4 and 4' of the two meters are connected across the mains. The lagging coils 5 and 5' are short-circuited in the usual manner. The series coils 3 of the upper motor mechanism are connected in series with a resistance 32 across the lines 30 31. The series coils 3' of the lower motor mechanism are connected in series with an adjustable resistance 33 of greater ohmic value than the resistance 32 across the lines. In the manufacture of electric measuring instruments it is common to use permanent magnets arranged in pairs and held in suitable clamps, and the testing device illustrated in the drawings is arranged for testing such pairs of magnets, though it will be understood that the construction can be readily changed to accommodate single magnets and magnets of various shapes. With the support 26 in the proper position of vertical adjustment a pair of magnets 34 to be tested held in a clamp 35 are placed upon the support 26 at its forward end and are moved along over the support to slide them into position, with one pole of each magnet above and the other below the inclosure 24, until further movement is arrested by the magnets engaging the adjustable stops 17. In this position the flux of the magnets 34 intersects the disk 7' of the lower motor mechanism and retards the rotation of the moving element thereof. If the ohmic value of the resistance 33 cut into the circuit of the series coils 3' of the lower motor is the same as that of the resistance 32, so that the coils of one motor receive the same amount of current as the corresponding coils of the other, the two motors will develop the same amount of torque, since they are similar in every respect, have similar constants and characteristics, and are connected in the same circuit. This will be true regardless of changes of voltage, frequency, and wave form of the lines 30 and 31, as such changes affect both motors alike. If the standard magnets 8 and the magnets 34 to be tested are of the same strength, they will exert the same drag effects on the moving elements of the two motor mechanisms, which will therefore rotate at the same speed, and in this case the intermediate wheel 18 of the differential gear will not turn around shaft 12, though it will of course rotate on its shaft 19. The ring 22, therefore, will not be moved, and the operator by looking through the glass 37 in the casing 1 will know that the two shafts are rotating at the same speed from the fact that the ring 22 does not move relatively to the indicator 23. If the magnets 34 to be tested are of a different strength from that of the standard magnets 8, the shafts of the two motors will rotate at different speeds and the intermediate wheel 18 of the differential gear will not only turn upon its own shaft 19, but will move around the shaft 12, and thus cause ring 22 to move relatively to the indicator 23. If the magnets to be tested are of greater strength than the standard magnets, the ring will move in one direction, and if of less strength it will move in the opposite direction.

From the rate and direction of movement of ring 22 relative to indicator 23 a measurement of the strength of the magnets to be tested relative to the standard magnets can be obtained. However, in order that the measurements may be more rapidly obtained I provide means for adjusting the current supplied to one of the motors and obtain the measurements by a comparison of the torques of the two motors. This is done in the following manner: The operator on noticing the movement of the ring 22 moves the arm 38, governing the adjustable resistance 33, to vary the current flowing through the series coils 3' of the lower motor, thus changing the speed of rotation of the movable element of the lower motor until the moving elements of the two motors are rotating at the same speed again, which fact will be indicated by the ring 22 of the differential gear and the indicator 23. In this case the strength of the magnets to be tested bears to the strength of the standard magnets the same relation as the energy expressed in watts consumed in the actuating-coils of the lower motor bears to that consumed in the coils of the upper motor. However, it is unnecessary to measure the watts consumed, as the two motors are connected in the same circuit, and fixed and adjustable resistances 32 and 33 of known values are included in the circuits of the two series coils 3 and 3', respectively, and the strength of the magnets to be tested relatively to that of the standard magnets may be found from the values of the fixed known resistance 32 and the portion of the adjustable resistance 33 cut into circuit to bring the two motors to the same speed. To further simplify the operation of making the measurements, the adjustable resistance 33 may be calibrated, so that the measurement is obtained immediately from the position of the rheostat-arm 38 of the adjustable resistance when the ring 22 is brought to rest. In Fig. 2 I show the rheostat marked off to read in per cent. of strength of the magnets to be tested relatively to the standard magnets, which are taken as one hundred per cent.

It will be seen that the instrument is independent of changes in the voltage, frequency, and wave form of the actuating-current, that since changes of temperature effect both motor mechanisms alike it is independent of such changes, and that since all the parts are inclosed within the casing they are not affected by air-currents. A slight movement of the ring 22 relatively to the indicator 23 is readily detected, and therefore the arm 38 may be quickly brought to the proper position to give equal rotation of the movable elements of the two motor mechanisms. This, together with the fact that the magnets to be tested can be quickly and accurately moved into position and need no further adjustment, makes it possible to work very rapidly.

Although the device I have illustrated and described herein is particularly useful in testing the strength of permanent magnets, I do not wish to be understood as limited to that use, as the novel combinations of parts set forth in the appended claims may be used for other purposes. Also various modifications of the construction of the magnet-testing device as illustrated in the drawings can be made without departing from the spirit of my invention, and all such modifications I aim to cover by the terms of the claims appended hereto.

What I claim as new, and desire to secure by Letters Patent of the United States, is—

1. A testing device comprising a standard magnet, and means for indicating the effective strength of another magnet in comparison with that of the standard magnet.

2. A testing device comprising a standard magnet, a motor, a plate of conducting material driven by said motor arranged to revolve in the field of said magnet, a second motor, a plate driven thereby, and means for comparing the retarding strength of the standard magnet and that of a magnet so placed that the second plate cuts its magnetic field.

3. The combination of two motors, means for indicating their relative speeds, a plate of conducting material driven by one of said motors, and means for facilitating the application of a magnet to said plate so that the plate cuts the flux of its field.

4. The combination of two motors, means for indicating their relative speeds, a plate of conducting material driven by one of said motors, and a supporting device for holding a magnet in position for said plate to cut the field thereof.

5. The combination of two motors, means for indicating their relative speeds, a plate of conducting material driven by one of said motors, a support for holding a magnet in position for said plate to cut the field thereof, and means permitting adjustment of the support relative to the plate.

6. The combination of two motors, means for indicating the relative speeds thereof, a plate of conducting material driven by one of said motors, and a casing inclosing the parts shaped to permit applying a magnet to the plate so that the latter cuts its field.

7. The combination of two motors, means for indicating their relative speeds, a plate of conducting material driven by one of said motors, and thin sheets of non-magnetic material mounted above and below said plate.

8. The combination of two motors, means for indicating their relative speeds, a plate of conducting material driven by one of said motors, and a casing inclosing the parts including thin sheets of non-magnetic material mounted above and below said plate.

9. The combination of two motors, means for indicating their relative speeds, a plate of conducting material driven by one of said motors, a supporting device over which a magnet may be slid to move it to a position in which said plate cuts its field, and an adjustable stop to limit the position of the magnet.

10. The combination of two motors, means for indicating the relative speeds thereof, a plate of conducting material driven by one of said motors, a supporting device for holding a magnet in a definite relation to said plate permitting magnets to be rapidly mounted in position thereon and withdrawn therefrom, and means for adjusting the relation in which the magnets are held.

11. The combination of two motors, means for indicating the relative speeds thereof, a plate of conducting material driven by one of said motors, a magnet whose field is cut by said plate, a second plate of conducting material driven by the other motor, and means for facilitating the application of magnets to said plate so that the plate cuts the magnetic field.

12. The combination of two motors, a differential gear actuated by the shafts thereof, an indicator controlled by said gear, a plate of conducting material driven by the shaft of one of said motors, and means for facilitating the application of magnets to said plate so that the plate cuts the magnetic field.

13. The combination of two motors, a differential gear actuated by the shafts thereof, an indicator controlled by the intermediate of said gear, a plate of conducting material driven by one of said motors, a magnet whose field is cut by said plate, a second plate of conducting material driven by the other motor, and means for facilitating the application of the magnets to said plate so that the plate cuts the magnetic field.

14. The combination of two electric motors, means for indicating their relative speeds, disks of conducting material driven by the shafts thereof, a magnet whose field is cut by the disk of one of the motors, and means for holding a magnet in a definite relation to the disk of the other motor.

15. The combination of an electric circuit, two electric motors connected therein, means for indicating the relative speeds of said motors, a resistance in circuit with one motor, and an adjustable resistance in series with the other motor.

16. The combination of an electric circuit, two electric motors connected therein, a differential gear actuated by the shafts of said motors, indicating devices controlled by said gear, a resistance in circuit with one of said motors, and an adjustable resistance in circuit with the other of said motors.

17. The combination of an electric circuit, two electric motors connected therein, means for indicating the relative speeds of said motors, an adjustable resistance in circuit with one of said motors, a plate of conducting material driven by said motor, and means for facilitating applying magnets to said plate so that the plate cuts the magnetic field.

18. The combination of an electric circuit, two electric motors connected therein, means for indicating the relative speeds of said motors, a resistance in circuit with one of said motors, a disk of conducting material driven by said motor, a magnet in whose field the disk moves, an adjustable resistance in circuit with the other motor, a disk of conducting material driven by said motor, and means for facilitating applying magnets to said disk so that the disk cuts the magnetic fields thereof.

19. A magnet-testing device comprising a motor mechanism, a plate of conducting material driven thereby, and a casing inclosing the motor mechanism and plate shaped to permit applying a magnet to the plate so that the latter cuts its field.

20. A magnet-testing device comprising a motor mechanism, a plate of conducting material driven thereby, and a casing inclosing the motor mechanism and plate including thin sheets of non-magnetic material above and below the plate.

21. A magnet-testing device comprising a motor mechanism, a plate of conducting material driven thereby, a casing inclosing the motor mechanism and plate including thin sheets of non-magnetic material above and below the plate, and a support for holding a magnet in position for said plate to cut the flux of its field.

22. A magnet-testing device comprising a motor mechanism, a plate of conducting material driven thereby, a casing inclosing the motor mechanism and plate including thin sheets of non-magnetic material above and below the plate, a support for holding a magnet in position for said plate to cut the flux of its field, and means for adjusting said support relative to said plate.

23. A magnet-testing device comprising a motor mechanism, means for adjusting the speed thereof, a plate of conducting material driven by the motor, a support on which a magnet is adapted to be rested to hold the magnet in position for the plate to cut its field, and means permitting adjustment of the support toward and away from the plate.

24. A magnet-testing device comprising a motor mechanism, a plate of conducting material driven thereby, and a supporting device over which a magnet is adapted to be slid to move it to and away from a position in which the plate cuts the field of the magnet.

25. A magnet-testing device comprising a motor mechanism, a plate of conducting material driven thereby, a supporting device over which a magnet is adapted to be slid to move it to and away from a position in which the plate cuts the field of the magnet, and an adjustable stop to limit the movement of the magnet into position.

26. A magnet-testing device comprising a motor mechanism, means for adjusting the speed thereof, a plate of conducting material driven by the mechanism, and a supporting device for holding a magnet in a definite relation to said plate with the plate cutting the field thereof and permitting magnets to be readily mounted in position thereon and withdrawn therefrom.

27. A magnet-testing device comprising an electric motor, means for adjusting the supply of current thereto, a plate of conducting material driven by the motor, and a supporting device for holding a magnet in a definite relation to said plate with the plate cutting the field thereof and permitting magnets to be readily mounted in position thereon and withdrawn therefrom.

28. A magnet-testing device comprising a motor mechanism, a plate of conducting material driven thereby, and an inclosure for said plate shaped to permit a magnet to be moved to a position in which the poles thereof embrace the inclosure and the plate of the conducting material therein.

In witness whereof I have hereunto set my hand this 20th day of October, 1905.

ALVARADO L. R. ELLIS.

Witnesses:
  JOHN A. MCMANUS,
  HENRY O. WESTENDARP.